United States Patent [19]
Moore

[11] Patent Number: 4,502,043
[45] Date of Patent: Feb. 26, 1985

[54] ENGINE TEMPERATURE TRANSIENT COMPENSATING CIRCUIT

[75] Inventor: M. Samuel Moore, Northridge, Calif.

[73] Assignee: Semco Instruments, Inc., North Hollywood, Calif.

[21] Appl. No.: 357,587

[22] Filed: Mar. 12, 1982

[51] Int. Cl.³ .......................................... G01M 15/00
[52] U.S. Cl. ..................................... 340/588; 73/116; 374/144
[58] Field of Search ................. 73/117.3, 116; 340/57, 340/588; 374/102, 103, 144

[56] References Cited

U.S. PATENT DOCUMENTS

| | | | |
|---|---|---|---|
| 3,035,443 | 5/1962 | Gray | 73/116 UX |
| 3,277,458 | 10/1966 | Greenwood | 340/588 |
| 3,931,619 | 1/1976 | Moore et al. | 73/116 |
| 3,946,364 | 3/1976 | Codomo et al. | 374/102 X |
| 4,315,296 | 2/1982 | Hancock | 361/103 |

*Primary Examiner*—Jerry W. Myracle
*Attorney, Agent, or Firm*—Poms, Smith, Lande & Rose

[57] ABSTRACT

A turbine engine may occasionally be required to operate momentarily at an overtemperature condition which, provided it does not exceed a predetermined maximum temperature and time duration, is known to be harmless. A temperature read-out device attached to an engine operating under such conditions would measure this harmless overtemperature transient, indicate an overtemperature state, and display a warning. The circuitry of the present invention monitors a signal representing engine temperature, and beginning at the start of the harmless overtemperature transient, and generates an opposing compensating signal for a predetermined period of time. The opposing compensating signal is combined with the signal representing engine temperature and the resultant signal, is applied to the temperature readout device so that the signal representing engine temperature is reduced below the level which would cause an overtemperature condition to be indicated on the temperature readout device.

14 Claims, 4 Drawing Figures

ENGINE TEMPERATURE TRANSIENT COMPENSATING CIRCUIT

FIELD OF THE INVENTION

This invention relates to engine monitoring and signal modification systems.

BACKGROUND OF THE INVENTION

This invention is directed to an engine transient compensating circuit for sensing the start of a harmless overtemperature transient occurring in an engine, and for preventing the indication of an overtemperature condition when this overtemperature condition is harmless. The device has a temperature sensor, means for detecting the harmless overtemperature transient, and circuitry for generating a compensating signal which prevents an overtemperature indication when none is required.

Engines, particularly turbine engines, which are used in critical or industrial situations require the constant monitoring of operating temperature so that in the event the temperature exceeds safe limits, the engine may be shut down or the load decreased until engine temperature is reduced to a safe range. However, an engine may occasionally be required to operate for brief periods of time at loads or under other conditions which cause temperature to rise for a brief period of time, and then drop after the engine component expansion normalizes, or the increased load or other condition is removed. Such a brief temperature rise, so long as it is of relatively short duration and magnitude, is not harmful, is basically absorbed by the thermal mass of the engine, and may be ignored.

Presently available temperature monitoring systems are comprised of warning lights and/or gauges which signal an operator either by lights, sounds, needle movement or some other manner, that the engine temperature has reached a predetermined level considered high enough to merit such a warning. In the usual case, the operator then must make a quick decision whether to immediately reduce the operating stresses or power of the engine, shut the engine down completely, or to leave the conditions as they are to see if the temperature will drop as operating conditions change. This takes the attention of the operator and forces him to examine the various factors involved such as the magnitude of the temperature spike, the duration of the rise, and the time elasped since any prior overtemperature conditions. In a critical situation, this diversion of attention may cause the operator to lose track of other important matters which merit his consideration.

For example, a helicopter pilot may wish to gain altitude quickly under full load conditions, and in doing so, may subject the engine to a high load, causing the engine temperature to rise, but for only a relatively short period of time until the engine normalizes or the desired altitude is reached. The cockpit temperature monitoring devices presently available would register an overtemperature warning immediately requiring the pilot to reduce the power, when a predetermined high temperature is reached, without regard to the expected duration of the temperature spike or its relative magnitude. The helicopter pilot is then required to make a subjective decision whether to cease his climb immediately, or continue it for a time he feels is safe.

The circuitry of present invention is activated when a threshhold temperature is reached, and then monitors the magnitude of the temperature spike and its duration. Provided that the temperature does not exceed a predetermined maximum and does not last beyond a preset period of time, the engine transient compensating circuit generates a compensating signal which precludes the engine temperature indicators from displaying an over-temperature warning signal. The present invention also contains components which prevent it from operating more than once unless engine temperature first drops to a predetermined low safe value, thereby minimizing the possibility that a second or subsequent temperature rise would go undetected, causing a cumulative effect on the engine and possible damage.

Thus, the present invention prevents an overtemperature warning from being displayed unless it is actually necessary.

SUMMARY OF THE INVENTION

In accordance with the present invention, the engine is provided with a temperature sensing device which, in the preferred embodiment, is a thermocouple positioned to measure manifold gas temperature of a turbine engine and to provide a signal representing such temperature. Circuitry is provided to monitor this signal and to determine the onset of a harmless overtemperature transient. The transient compensator has internally programmed the transient overtemperature profile that is tenable or safe for the engine for a given time duration, and temperatures exceeding this profile will be displayed. The circuitry includes a means for generating an opposing compensating signal to reduce said transient for a period of time approximating a time predetermined to be the safe duration of the overtemperature transient. Arrangements are provided for combining said temperature signal and the compensating signal to provide a modified signal in which the overtemperature transient is reduced. This modified or compensated signal is applied to a temperature readout device which includes an overtemperature warning. Provided that the overtemperature transient does not exceed a predetermined magnitude or duration, the overtemperature warning will not be activated.

In accordance with a feature of the present invention, the engine transient compensation system includes a circuitry for detecting the onset of the harmless overtemperature transient, and for generating the opposing compensating signal including a capacitor and switching circuit for initiating the charging and discharging of the capacitor to form and time the opposing compensating signal. The switching circuit includes a comparator to derive a triggering pulse when the onset of the overtemperature transient is detected, and which generates a command to an analog switch having three states: the first state connecting the capacitor to a reference zero level; the second state coupling the capacitor to a source of charging current; and the third state discharging the capacitor through a programmed current. When said command is generated, the analog switch shifts from its first state to its charging position to initiate the charging of the capacitor and starting the formation of the opposing compensating signal.

In accordance with another feature of the invention, the analog switch may have three or more states, the additional states connecting the capacitor and the capacitor output circuit to various preset conditions.

In accordance with another feature of the invention, means are provided for determining the point at which the maximum desired compensating signal is being generated, and when this point is reached, for generating another triggering pulse to initiate the switching of the analog switch to its discharging state. At this point, the charging current to the capacitor is terminated, and the capacitor is connected to a current drain allowing for controlled discharge of the capacitor with the same or different time base.

In accordance with another feature of the invention, circuitry is provided for sensing the point at which the capacitor is fully discharged, and for shifting the analog switch to a state wherein the capacitor is connected to a reference potential level.

In accordance with a broad aspect of the present invention, means are provided for sensing engine temperature and for providing a signal representing the temperature. Circuitry is included for detecting an overtemperature transient and for generating an opposing compensating signal modified to reduce the transient for a predetermined period of time preventing any alarm condition as long as the transient is harmless. Also included is circuitry for combining the temperature signal and the opposing compensating signal in such a way that the overtemperature transient is reduced. Finally, the compensated signal is applied to a temperature indication device, whereby the harmless overtemperature transient will not produce an overtemperature warning.

In accordance with another feature of this invention, circuit means are provided for substractively combining the compensating signal with the amplified output signal from the thermocouple, resulting in the compensated signal which is applied to the temperature readout means.

In accordance with another aspect of this invention, circuitry is provided for preventing a second or subsequent operation of the engine transient compensating circuit unless the temperature of the engine drops below a predetermined safe minimum so that the transient compensating circuit cannot be re-engaged too quickly, thereby precluding damage to the engine.

In accordance with another broad aspect of the invention, the analog switch has at least two principal states, one for charging the capacitor and one for discharging the capacitor.

Other objects, features and advantages of the invention will become apparent from a consideration of the following detailed description and from the accompanying drawings.

DETAILED DESCRIPTION OF THE DRAWINGS

Figure 1:
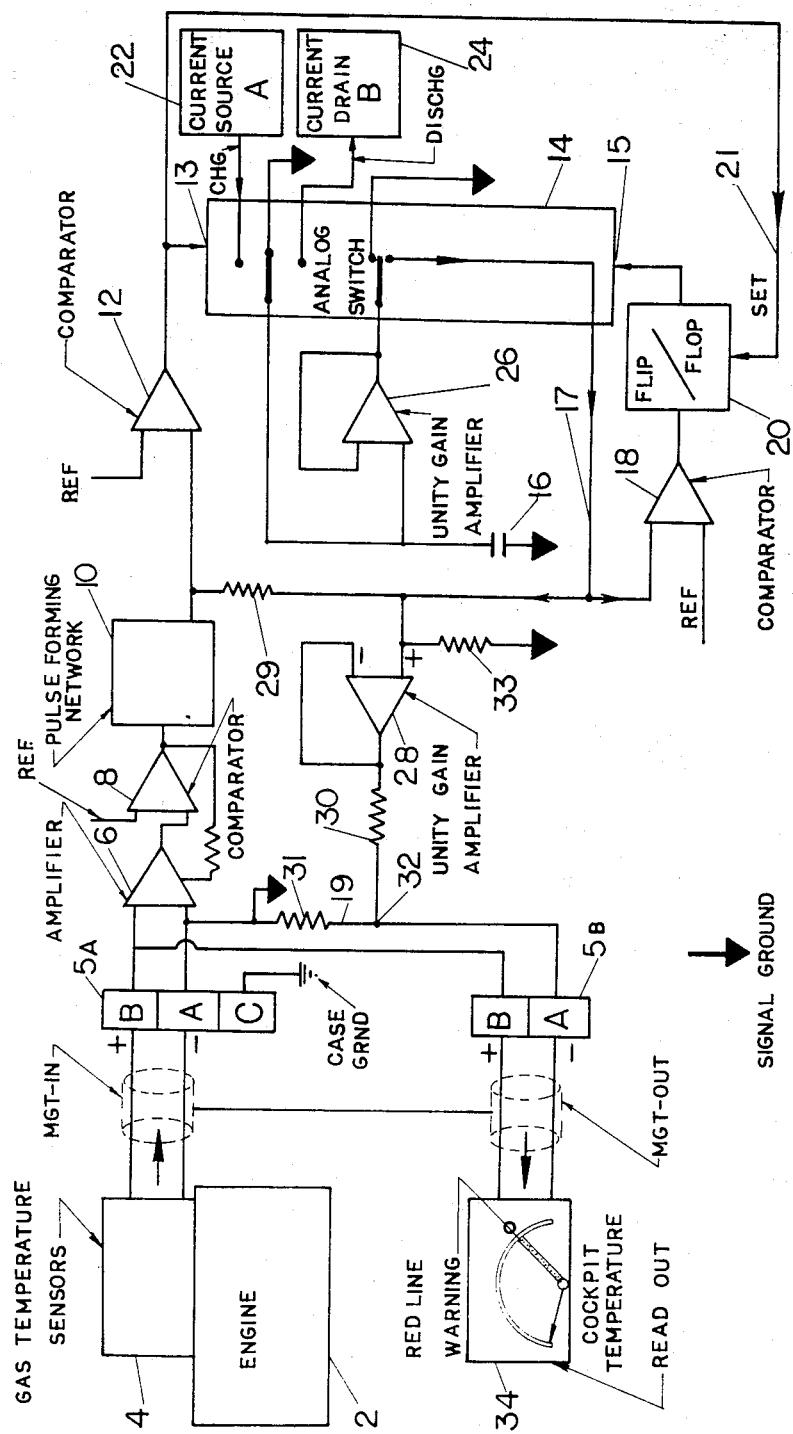
FIG. 1 is a block schematic diagram illustrating the principles of the present invention.

Referring to FIG. 1 of the drawings, a turbine engine 2 is represented by the block at the left of the drawing. The engine 2 may, for example, be a helicopter engine which occasionally approaches a high temperature known to be harmless for a short period of time, but which would cause an unnecessary overtemperature warning to be displayed on the cockpit temperature readout 34. Gas temperature sensors 4, commonly thermocouples, sense the engine temperature and convert it into an electrical signal representing temperature. The temperature measured may be manifold gas temperature (MGT). This temperature signal is directed into the engine transient compensation circuit through electrical connections or couplings 5a, through terminals A, B, and C. The compensation circuit may be mounted on a printed circuit board (as discussed below regarding FIG. 3) enclosed in a protective metal housing (not shown) on which are located the input connections 5A and the output connections 5B. If a printed circuit board is used, it may be constructed according to principles and techniques well known in the industry, on which are mounted integrated circuits and/or standard components, available from various electronic component manufacturers.

Arrows on the circuit lines indicate the direction of signal transmission.

The engine temperature signal from thermocouples is typically quite low, and by the use of an amplifier 6, the signal may be boosted to a level which permits reliable performance of the compensation circuit. This function may be implemented by Part No. MPS 312, an amplifier available from Micro Power Systems, or equivalent.

Comparator 8 monitors the amplified input signal and compares it to a reference voltage representing a precursor level of the harmless overtemperature transient, and when the input signal reaches this precursor level, the comparator changes state to initiate the generation of an opposing compensating signal by the balance of the circuit as described below. As an example, assuming that the engine is an Avco Lycoming LTS 101 engine used on the BHT Model 222 helicopter, the precursor temperature would be approximately 782±3 degrees Centigrade. The function of comparator 8 may be implemented by Part No. CA3260 from RCA, or equivalent.

Figure 2:
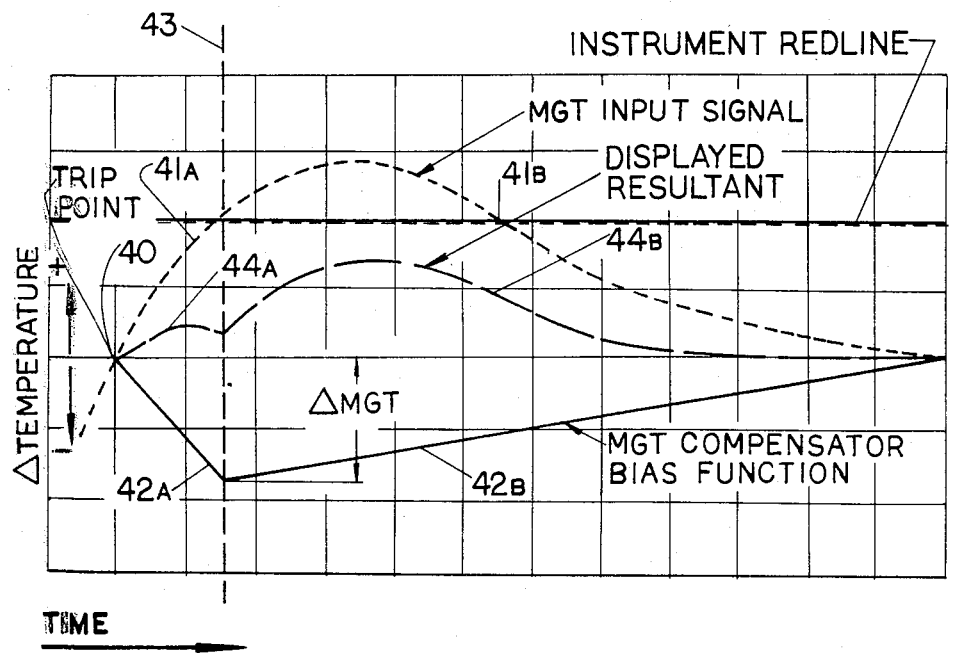
FIG. 2 is a plot depicting the engine temperature input signal, an opposing compensating signal, and a resultant curve representing the compensated output signal, illustrating a typical application of the invention.

Referring for a moment to FIG. 2 the precursor temperature level appears as the trip point 40. Plot 41A, 41B represents a typical harmless overtemperature transient which is labelled "MGT INPUT SIGNAL" where MGT stands for "manifold gas temperature". Time is represented along the horizontal axis, and temperature is represented along the vertical axis in the plots of FIG. 2.

Referring back to FIG. 1, when the trip point is reached and comparator 8 changes state, a pulse forming network 10 is energized and generates a triggering pulse which is detected by comparator 12 which, in turn, changes state to generate an impulse which is applied to comparator analog switch 14 at terminal 13. The function of comparator 12 may be implemented by Part No. CA3260 from RCA, or equivalent.

Prior to the generation of said triggering pulse by comparator 12, the analog switch 14 is in a ground state with no compensating signal being formed, so that until the trip point 40 is reached, the cockpit temperature readout 34 displays the true engine temperature.

When the pulse generated by comparator 12 signals the analog switch 14 to change state, the switch closes appropriate circuits to begin the charging of capacitor 16 from current source 22 which may be a current mirror, part no. 2N3811 from National, or an equivalent. While the capacitor 16 is being charged, it provides a signal which is routed by the analog switch through circuit 17, and amplifier 28 to point 32, and is applied to resistor 31 in opposition to the thermocouple signal through resistor 30 which scales the exact correction level.

In the resistor 31, the signal from capacitor 16 is summed with the signal from the thermocouple producing a reduced and compensated signal at point 32 which passes through the electrical connections 5b to the cockpit temperature readout 34.

Referring again to FIG. 2, a typical situation is illustrated. While the capacitor 16 is in its charging state, it provides the compensating signal represented by line 42A. A normally encountered engine temperature input signal during this same period is shown by curve 41A. Combining the two curves we arrive at resultant 44A, which represents the temperature displayed in the cockpit.

In FIG. 1, unity gain amplifiers 26 and 28 couple the capacitor output to the intended compensation output point 32. Amplifiers 26 and 28 may be implemented by Part No. CA1558, operational amplifiers available from RCA, or equivalents.

Resistors 29, 30, 31 and 33 may be varied depending upon system parameters. These parameters may vary according to the type of temperature sensors, thermocouples, circuit components, etc. Resistor 31 is normally very small, in order of one ohm, and resistor 30 would normally have a value of several thousand ohms. By choosing appropriate values for these resistors and other related components, the engine transient compensating circuit may be modified for use in a variety of engines operating over a broad range of conditions.

Capacitor 16 is charged for a relatively short period of time until the compensating signal generated by it reaches a predetermined maximum safe level. Using again the example of an LTS101 engine, this point is reached when the compensating signal reaches a level representing a temperature reduction of approximately 17° C. as displayed on the cockpit temperature readout 34. It takes approximately 15±2 seconds for this to happen. This point is shown up to dotted line 43 in FIG. 2. By choosing appropriate circuit components, the arrival at this point may be advanced or delayed, and the maximum temperature depression may be increased or decreased depending on the engine and its applications.

Discharge comparator 18, whose function can be performed by Part No. LM111 from National, or equivalent, monitors capcitor 16 output and compares it to a reference voltage. At the point at which the capacitor is providing the maximum desired compensating signal, comparator 18 signals the flip-flop or bistable circuit 20 and it in turn commands the analog switch 14 through terminal 15 to switch from the charging state to its discharge state. Upon receiving said command, the analog switch 14 opens and closes appropriate circuits, terminates the charging current from source 22 and provides a circuit path to current drain 24, allowing the capacitor 16 to be discharged at a predetermined rate. The function of current drain 24 may be performed by Part No. 2N2920, a matched transistor available from National, or equivalent.

During its discharge cycle, the capacitor output decreases over time and generates a curve such as that shown at 42B in FIG. 2. This compensating current from the capacitor is combined with the temperature input signal 41B in FIG. 2, in the same manner as previously described. This results in the compensated signal 44B shown in FIG. 2, which is received by the cockpit display 34.

Comparator 12 performs a dual function, also monitoring the capacitor 16 output and comparing it to a reference. When the capacitor 16 is fully discharged, comparator 12 changes to its original state initiating another command to the analog switch 14 at input terminal 13. The analog switch 14 then switches to a state in which the capacitor 16 is electrically connected to ground. Comparator 12 also provides a reset command to the flip/flop 20 on lead 21 resetting it to its original state, and after these steps are accomplished, the analog switch 14 is ready to be reactivated when the need for an engine transient compensating signal is again required, providing that the temperature level drops below the reset level which is set by resistor 7 providing a temperature delay hystersis. Flip/flop 20 may be Part No. CD4013 from National, or an equivalent.

Figure 3A:
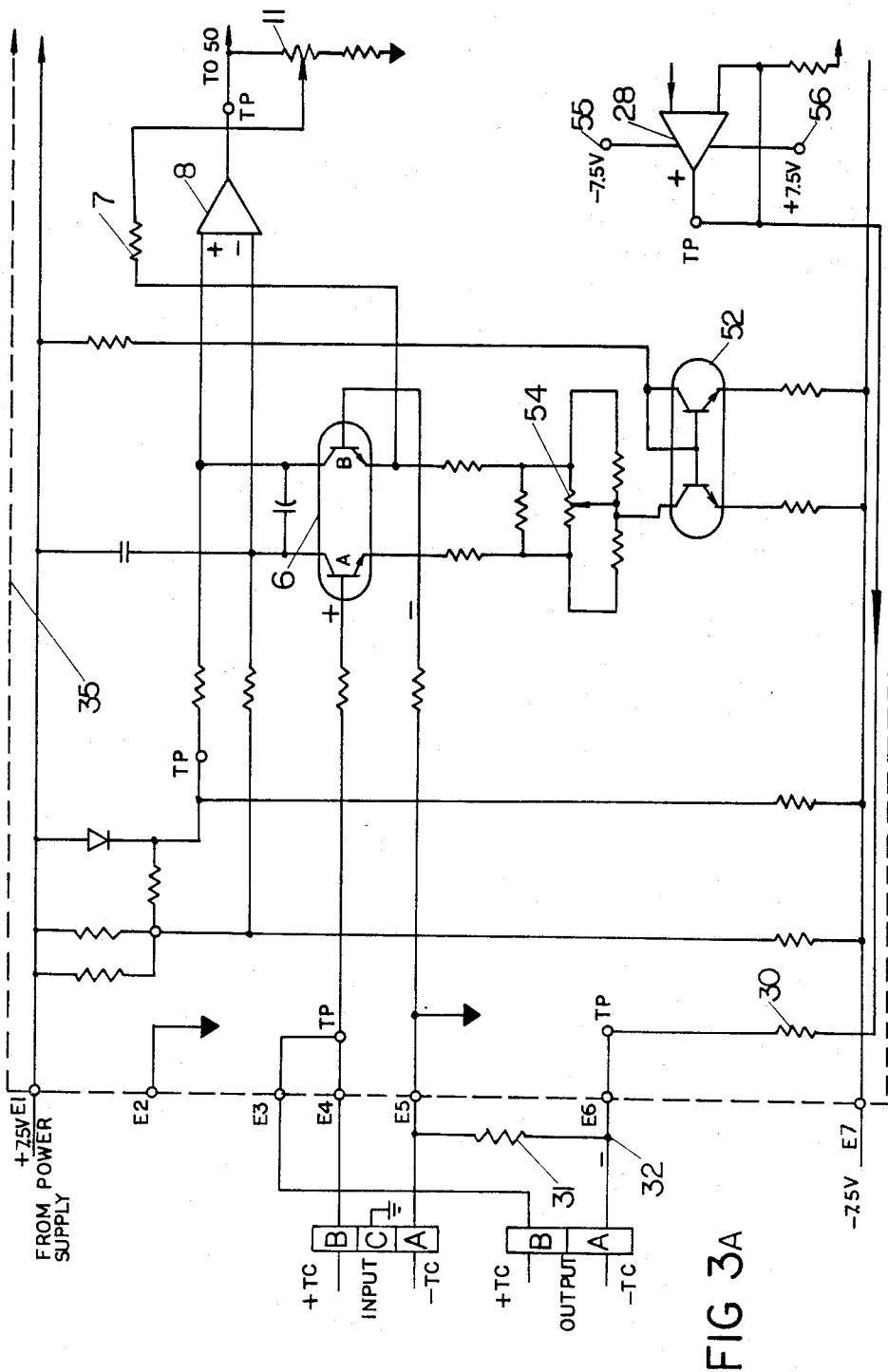
FIGS. 3A and 3B make up a detailed circuit diagram of the engine transient compensation circuit shown schematically in FIG. 1.
Figure 3B:
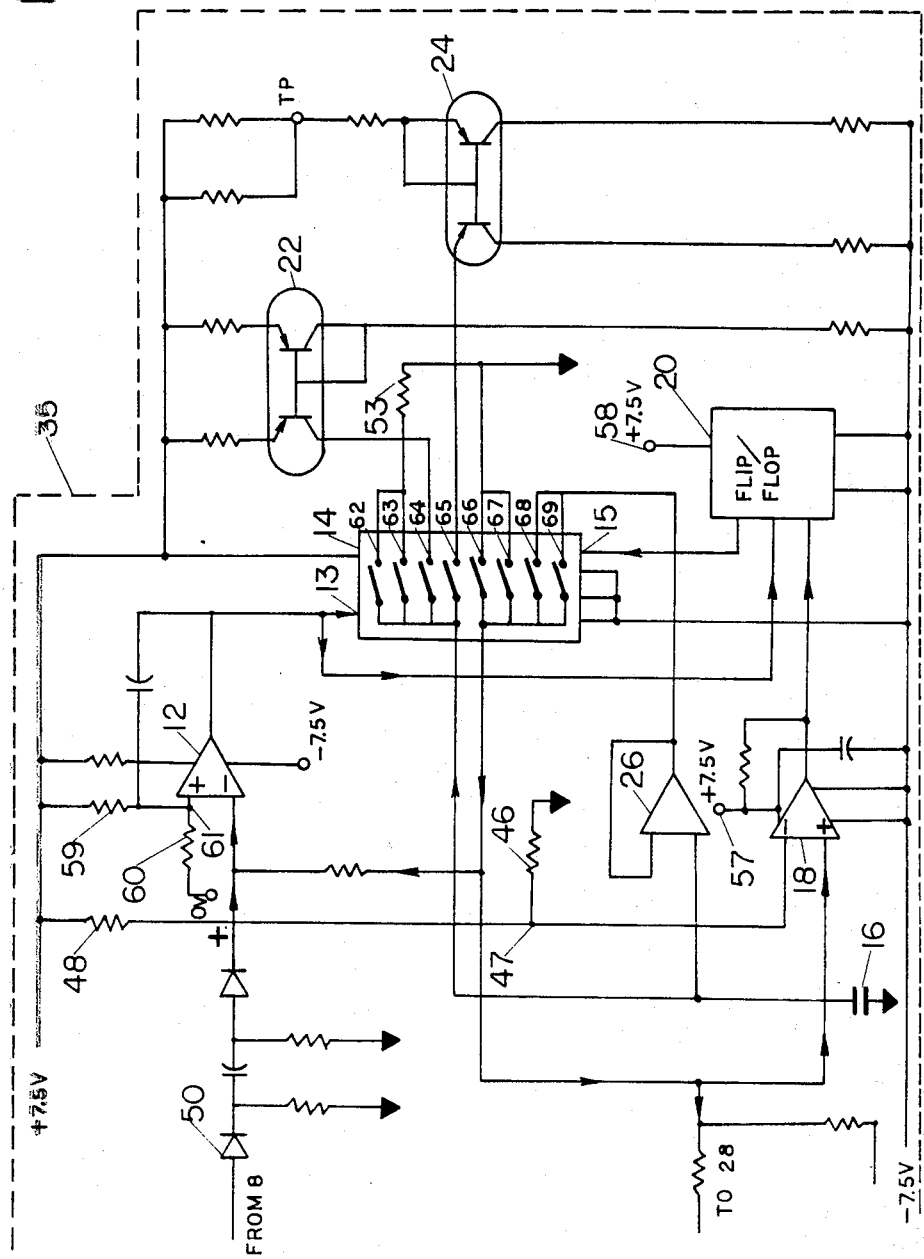

FIGS. 3a and 3b together form a detailed circuit diagram of an illustrative embodiment of the subject invention. The dashed line around the circuit represents the boundary of a printed circuit board 35 which contains substantially the circuit represented in the diagram. Points E4 and E5 represent electrical coupling terminals at which the circuit board 35 is connected to receive the signal representing engine temperature. Points E3 and E6 are connections through which the compensated temperature signal is applied to the cockpit temperature readout 34, not shown in this figure. This particular embodiment operates from a power supply of ±7.5 volts DC which is provided by an external power supply connected at points E1, E7, 55, 56, 57, and 58. The designation by the solid ground symbol in FIGS. 1 and 3 represents signal ground. These points are connected to the power supply. Points labelled TP are test points used in calibrating the circuit for its particular application. Point E2 is a connection to signal ground.

In the embodiment of diagram 3A and 3B, current source 52 (FIG. 3A) provides a constant current source for the differential amplifier 6 through resistor 54. Resistor 54 is variable and can be set as desired to vary the trip point of the engine transient compensating circuit, depending upon the engine in use, operating conditions, safety factors, etc.

Diode 50 blocks the transmission of negative pulses.

As previously discussed, comparator 18 (FIG. 3B) monitors the output potential of capacitor 16, and at the point when the capacitor 16 is providing the maximum desired compensating signal, comparator 18 changes state and initiates the discharge cycle of the capacitor 16. Comparator 18 determines this point by comparing capacitor 16 output with a reference potential which, in this embodiment, is the voltage level at the intersection of resistors 48 and 46 represented in FIG. 3B as summing point 47.

As previously discussed, comparator 12 also monitors capacitor 16 output and signals the analog switch 14 to return to its ground state when comparator 12 senses that the capacitor has been fully discharged. This determination is made by comparing capacitor 16 output to a reference voltage determined at the intersection of resistors 59 and 60 at summing point 61.

The analog switch as embodied in FIG. 3 has four states: a charging state, a discharging state, an intermediate ground state, and a ground state. At rest, before the engine transient compensating circuit is activated, the analog switch 14 is in its ground state, with switches 62 and 66 closed and the balance open, which grounds capacitor 16 through resistor 53 to signal ground. When the trip point is reached, which in the previous example was approximately 782° C., comparator 12 changes state and commands the analog switch 14 to change from its ground state to its charging state. At that point, switches 64 and 68 are closed and the balance are opened. This connects capacitor 16 to current source 22, and provides a circuit path for the capacitor's compensating signal to flow through unity gain amplifiers 26 and 28 to the compensation point 32. When discharge comparator 18 senses that capacitor 16 is sufficiently charged to provide the maximum desired compensating signal, it commands the flip/flop 20 to reset analog switch 14 through terminal 15, closing switches 65 and 69 and opening the rest of the switches. This provides a circuit path by which capacitor 16 is discharged through switch 65 into current drain 24, but at the same time maintains a signal path through switch 69 for the compensating signal at the output of capacitor 16 through unity gain amplifier 26 into the balance of the circuit to the point 32.

When comparator 12 senses that capacitor 16 is fully discharged, it transmits a pulse to analog switch 14 through terminal 13 which causes it to change to its intermediate ground state by closing switches 63 and 67 and opening the rest. This connects capacitor 16 to signal ground through resistor 53 and also grounds the balance of the circuit.

Flip/flop control 20 has not yet been reset to its ground or ready position, and this is accomplished by command from comparator 12. The flip/flop 20 is reset, but in so doing, it sends another command to analog switch 14 through terminal 15. This final command in the cycle closes switches 62 and 66 opening the balance of the switching circuits, and the analog switch 14 is back to its ground state ready to be reactivated as necessary.

A safety system has been incorporated into this embodiment of the invention to prevent a too-rapid reinitiation of the engine transient compensating circuit, unless the engine 2 has cooled down to a predetermined safe temperature. In this embodiment, an hysteresis circuit has been provided to prevent comparator 8 from returning to its original state unless the engine temperature drops below the predetermined safe level.

The hysteresis circuit includes resistors 7 and 11, and differential amplifier 6. In operation, at normal safe operating temperatures, the "plus" input to comparator 8 is at a more negative potential than the "minus" input, in part because the emitter resistor of transistor 6-A is reater than that of its paired transistor 6-B in the differential amplifier. As the temperature increases, the voltage at the collectors of the differential amplifier transistors will shift toward equality, and when they reach equality, the comparator 8 will change state and shift to a positive output. This applies a positive voltage to resistor 11 which is fed back through resistor 7 to the emitter of transistor 6-B, thereby lowering the resetting temperature at which the "plus" input to comparator circuit 8 drops below the "minus" input, by the desired number of degrees.

Resistor 11 is a variable resistor which allows the hysteresis to be varied by approximately 20 degrees centigrade after the circuit is initially calibrated. Therefore, unless the safe temperature is reached, the engine transient compensating circuit will not operate and the cockpit temperature readout 34 will register true temperature and provide a warning if an overtemperature condition is reached. In the case of the LTS 101 engine used as an example previously, this temperature may be approximately 740° C.

In conclusion, it is to be understood that the foregoing description and the drawings relate to one illustrative embodiment of the invention. Other variations in logic circuit implementation could be employed; for example, the compensating characteristic 42A and 42B could be curved rather than formed of two straight lines; the logic circuitry could be implemented by digital rather than analog circuitry, and variations in the circuit arrangements could be employed to achieve the same functional results. Accordingly, the present invention is not limited to that precisely as illustrated herein.

What is claimed is:

1. An engine transient compensating circuit comprising:
   means for sensing the temperature of an engine which may have a harmless overtemperature transient for a predetermined period of time, and for providing a signal representing said temperature;
   means for generating an opposing compensating signal modified to reduce said transient, for a period of time approximately said predetermined period of time, including a capacitor and switching circuit means for initiating the charging and discharging of said capacitor to form the opposing compensating signal;
   means for combining said temperature signal and said compensating signal to provide a compensated output signal in which said overtemperature transient is reduced;
   means for displaying temperature readout including an overtemperature warning; and
   means for applying said compensated output signal to said displaying means so that said overtemperature transient does not produce an overtemperature warning under normal operating conditions, but an abnormally high transient overtemperature condition will still produce an overtemperature warning.

2. An engine transient compensating circuit as defined in claim 1 wherein the switching circuit means includes an analog switch for initiating the charging and discharging of the capacitor to form the opposing compensating signal, said analog switch having at least two states: the first state connecting said capacitor to a source of charging current, and the second state permitting said capacitor to discharge.

3. An engine transient compensating circuit as defined in claim 2 wherein said switching circuit means further includes a second generating means for generating a triggering pulse when the engine passes a predetermined temperature representing the harmless overtemperature transient, and to set the analog switch to its charging position, and for initiating the charging of said capacitor to start the formulation of the opposing compensating signal.

4. An engine transient compensating circuit as defined in claim 3 wherein the switching circuit means further includes a determining means for determining the point at which the capacitor is sufficiently charged to provide the maximum desired compensating signal, and when said point is reached, for generating a second triggering pulse to initiate the switching of the analog switch to the discharging state.

5. An engine transient compensating circuit as defined in claim 4 wherein the switching circuit means further includes means for sensing the presence of said second triggering pulse and for switching the analog switch to its discharge state which terminates the charging current to the capacitor, and initiates the capacitor's discharge cycle.

6. An engine transient compensating circuit as defined in claim 5 wherein the switching circuit means includes a switch actuation means for sensing the point at which the capacitor is fully discharged, and for then resetting the analog switch to first state wherein said capacitor is connected to a reference potential level.

7. An engine transient compensating circuit as defined in claim 6 wherein said switch actuation means includes a comparator means for determining when the capacitor has been fully discharged by monitoring capacitor output, at which point the comparator means provides a setting signal, and circuit means responsive to sensing said setting signal, for switching said analog switch to its first state.

8. An engine transient compensating circuit as defined in claim 1 further comprising a current source for providing charging current to the capacitor.

9. An engine transient compensating circuit as defined in claim 8 further comprising a current drain for providing a controlled discharge of the capacitor.

10. An engine transient compensating circuit as defined in claim 1 further comprising a hysteresis type circuit means for preventing the engine transient compensating circuit from being reactivated after one cycle unless engine temperature drops below a predetermined safe temperature.

11. An engine transient compensating circuit comprising:
temperature sensing means for sensing the temperature of an engine which may have a harmless overtemperature transient for a predetermined period of time, and for providing a signal representing said temperature;
generating means for generating an opposing compensating signal modified to reduce said transient, for a period of time approximating said predetermined period of time;
combining means for combining said temperature signal and said compensating signal to provide a compensated output signal in which said overtemperature transient is reduced;
display means for displaying temperature readout including an overtemperature warning; and
means for applying said compensated output signal to said display means, said overtemperature transient not producing an overtemperature warning under normal operating conditions, but producing an overtemperature warning under abnormally high overtemperature transient conditions.

12. An engine transient compensating circuit as defined in claims 1 or 11 further comprising comparator means for comparing said signal representing engine temperature to a reference, said reference representing a precursor of the harmless overtemperature transient, and for generating a triggering pulse signalling the start of the harmless overtemperature transient.

13. An engine transient compensation circuit comprising:
temperature sensing means for sensing the temperature of an engine which may have a harmless overtemperature transient for a predetermined period of time, and for providing a signal representing said temperature;
amplification means for amplifying said temperature signal as required by the engine transient compensation circuit;
comparator circuit means for comparing said signal representing engine temperature to a reference, said reference representing a precursor of the harmless overtemperature transient;
generating means for generating an opposing compensating signal modified to reduce said transient, for a period of time approximating said predetermined period of time, including an analog switch for initiating the charging and discharging of a capacitor to form the opposing compensating signal, said analog switch having at least two states: the first state connecting said capacitor to a source of charging current, and the second state permitting said capacitor to discharge;
pulse forming circuit means for generating a triggering pulse when said comparator circuit means indicates that the engine has reached the predetermined temperature representing a precursor of the harmless overtemperature transient;
means for applying the triggering pulse to the analog switch for causing the analog switch to change states;
second comparator means for determining the point at which the capacitor is sufficiently charged to provide the maximum desired compensating signal, and when said point is reached, for generating a second triggering pulse for initiating the switching of the analog switch to the discharging state;
sensing means for sensing the presence of said second triggering pulse and for switching the analog switch to its discharge state which terminates the charging current to the capacitor, and initiates the capacitor's discharge cycle;
switch actuation means for sensing the point at which the capacitor is fully discharged, and for then resetting the analog switch to its first state wherein said capacitor is connected to a reference potential level, said switch actuation means including a third comparator means for determining when the capacitor has been fully discharged by monitoring capacitor output, at which point the third comparator means provides a setting signal, and circuit means responsive to said setting signal, for switching said analog switch to its first state;
combining means for combining said temperature signal and said compensating signal to provide a compensated output signal in which said overtemperature transient is reduced;
display means for displaying temperature readout including an overtemperature warning;
means for applying said compensated output signal to said display means, said overtemperature transient not producing an overtemperature warning under normal operating conditions;
a current source for providing charging current to the capacitor;
a current drain for providing a controlled discharge of the capacitor; and,
a non-repeatability monitor circuit means for preventing the engine transient compensating circuit from being reactivated after one cycle unless engine temperature drops below a predetermined safe temperature.

14. An engine transient compensating circuit as defined in claim 13, wherein the analog switch includes three states: the first state connecting said capacitor to a reference potential level, the second state connecting the capacitor to a source of charging current, and the third state permitting the capacitor to discharge.

* * * * *